(12) United States Patent
Hamid et al.

(10) Patent No.: US 10,681,081 B2
(45) Date of Patent: Jun. 9, 2020

(54) SECURE CONTENT AND ENCRYPTION METHODS AND TECHNIQUES

(71) Applicant: Blulnk Ltd., Ottawa (CA)

(72) Inventors: Laurence Hamid, Ottawa (CA); Stephen Borza, Ottawa (CA)

(*) Notice: Subject to any disclaimer, the term of this patent is extended or adjusted under 35 U.S.C. 154(b) by 587 days.

(21) Appl. No.: 14/936,794

(22) Filed: Nov. 10, 2015

(65) Prior Publication Data
US 2016/0134642 A1 May 12, 2016

Related U.S. Application Data

(60) Provisional application No. 62/077,351, filed on Nov. 10, 2014.

(51) Int. Cl.
*H04L 29/06* (2006.01)

(52) U.S. Cl.
CPC .......... *H04L 63/145* (2013.01); *H04L 63/045* (2013.01); *H04L 63/061* (2013.01); *H04L 63/1483* (2013.01)

(58) Field of Classification Search
CPC . H04L 63/145; H04L 63/045; H04L 63/1483; H04L 63/061; H04L 9/00; H04L 9/32–9/3297; H04L 63/04–63/0492; H04L 63/08–63/0892; H04L 63/10; H04L 63/1408; H04L 63/1416; H04L 67/12; H04L 63/1441; H04L 29/06; G06F 15/16–18; G06F 21/00; G06F 21/30–46; G06F 21/60–06

(Continued)

(56) References Cited

U.S. PATENT DOCUMENTS

| 8,024,269 B1* | 9/2011 | Ballard | G06Q 10/10 |
| | | | 705/35 |
| 2003/0196080 A1* | 10/2003 | Karman | H04L 63/0435 |
| | | | 713/150 |

(Continued)

*Primary Examiner* — Alexander Lagor
*Assistant Examiner* — Quazi Farooqui
(74) *Attorney, Agent, or Firm* — Rosenberg, Klein & Lee

(57) ABSTRACT

In order to capture electronic information provided by a user to another user different third parties seek to download tracking software, viruses etc. to the user's computer systems. These may include, but are not limited to, message intercepting, email logging, hacking, spamming, phishing, spyware, malware, keyloggers, screen capturing, Trojan horses, WWW robots (BOTs or bots), IP spoofing, man-in-the-middle attacks, worms and viruses. Whilst within the prior art methodologies exist to protect the message by converting the plaintext at the sender's terminal to ciphertext for transmission before it is re-converted to plaintext at the receiver's (or recipient's) terminal once decrypted the message content, now in plaintext is accessible to malware, Trojan horse software, etc. upon the recipient's terminal allowing its contents to be acquired and transmitted without the recipient's and/or sender's knowledge. Accordingly, it would be beneficial to provide users with methods and systems enabling secure messaging to be undertaken as well as secure document transmission and viewing that overcomes the limitations within the prior art. Accordingly, beneficially embodiments of the invention provide secure messaging and secure document transmission even upon potentially compromised desktop computers.

18 Claims, 7 Drawing Sheets

(58) Field of Classification Search
USPC .......................................... 713/160; 726/22
See application file for complete search history.

(56) References Cited

U.S. PATENT DOCUMENTS

| | | | |
|---|---|---|---|
| 2010/0246811 A1* | 9/2010 | Sadler | H04L 9/3226 380/28 |
| 2013/0219516 A1* | 8/2013 | Shimshoni | H04L 63/083 726/28 |
| 2014/0061293 A1* | 3/2014 | Jayaprakash | G06F 16/9554 235/375 |
| 2014/0155094 A1* | 6/2014 | Zises | H04W 4/021 455/456.3 |
| 2015/0006672 A1* | 1/2015 | Morel | G06Q 30/0269 709/217 |
| 2015/0026465 A1* | 1/2015 | Cucinotta | H04L 63/0428 713/168 |

* cited by examiner

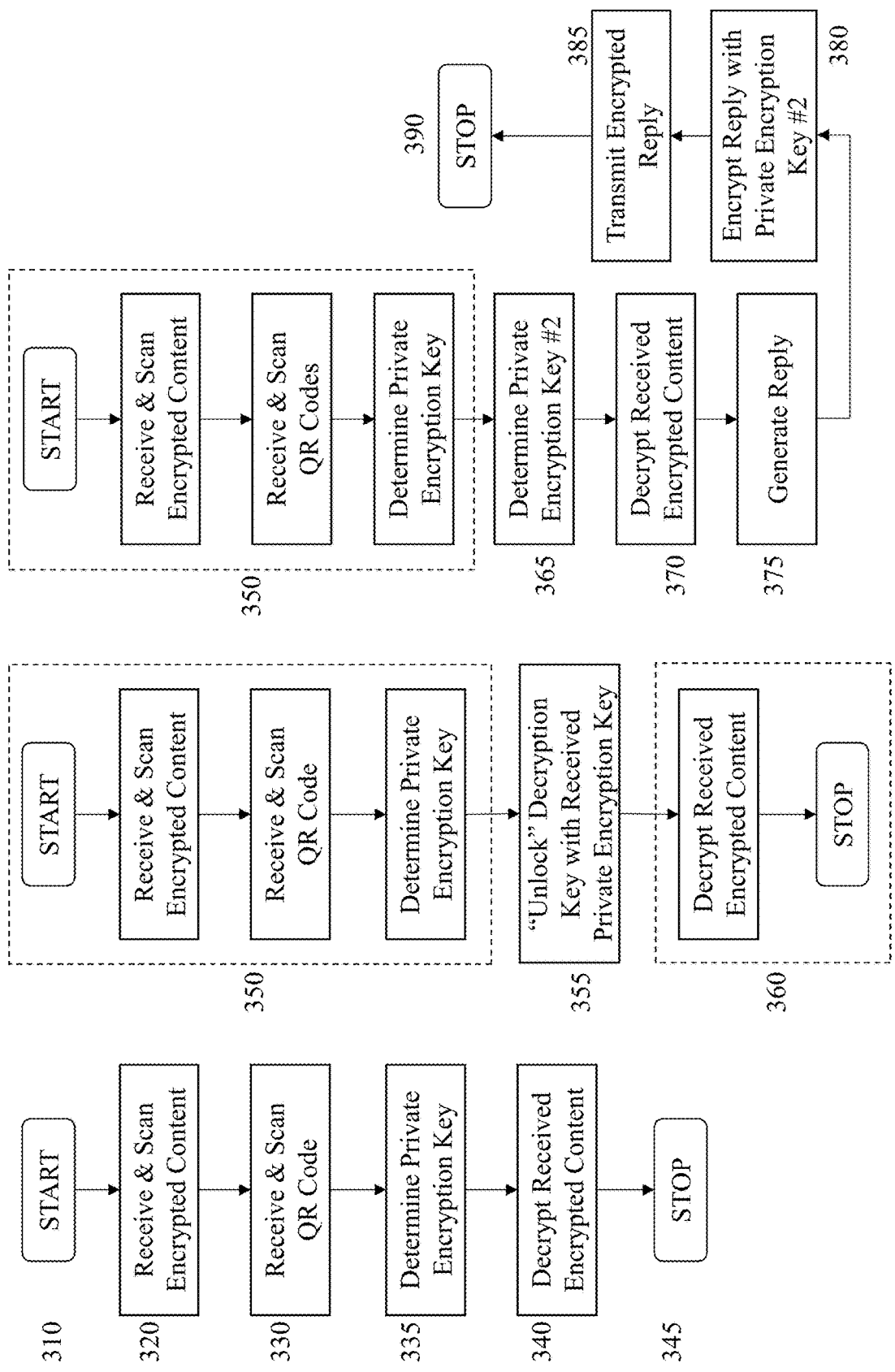

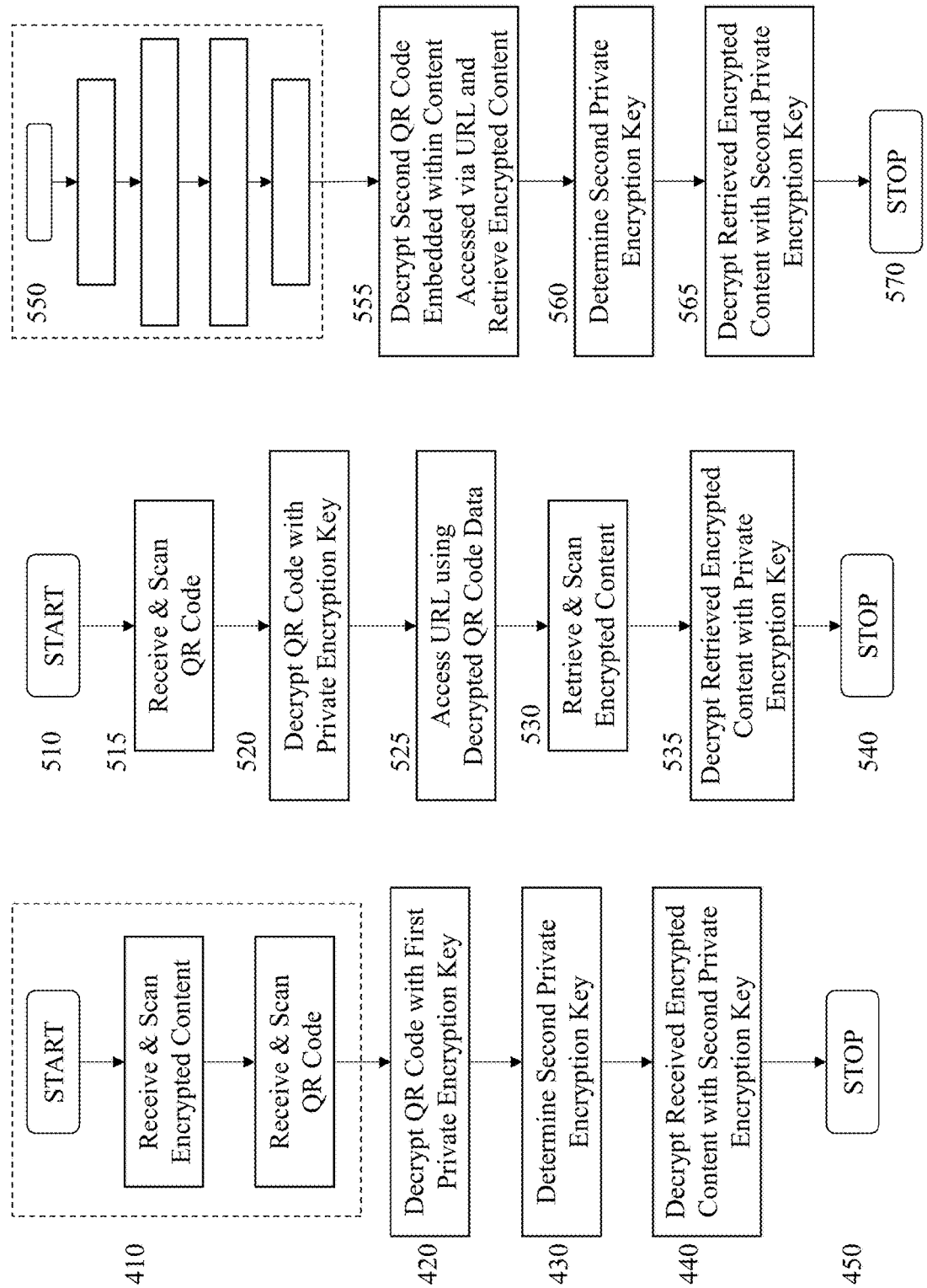

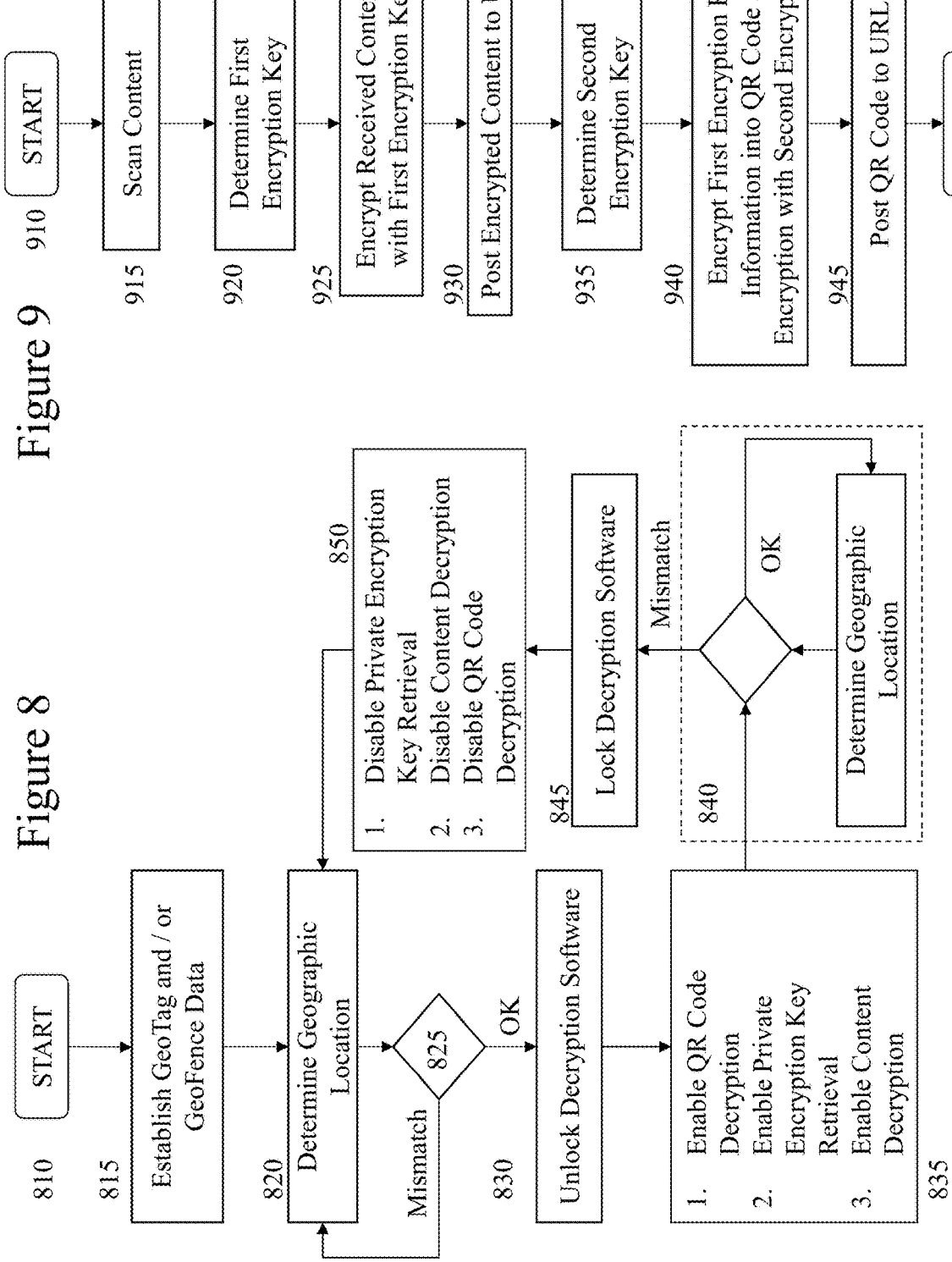

SECURE CONTENT AND ENCRYPTION METHODS AND TECHNIQUES

CROSS-REFERENCE TO RELATED APPLICATIONS

This application claims the benefit of priority from U.S. Provisional Patent Application Ser. No. 62/077,351 entitled "Secure Content and Encryption Methods and Techniques" filed Nov. 10, 2014, the entire contents of which are incorporated herein by reference.

FIELD OF THE INVENTION

This invention relates to messaging and encryption and more particularly to techniques for secure messaging and document viewing without exposing the decrypted message or document on a potentially compromised computer system.

BACKGROUND OF THE INVENTION

At present there are approximately 4 billion electronic mail (email) accounts in use globally rising to approximately 5 billion in 2017, of which about 25% are corporate email accounts. Business email accounts expected to generate over 130 billion emails in 2017. In addition to their email accounts users today commonly exploit instant messaging (IM) and simple message service (SMS) services as well as exploiting social networking, social media, blogs, and other electronic messaging systems.

Over this same period of time since the early 1980s that electronic messaging has grown then so have the approaches for third parties to gain access to these communications, to the computer systems transmitting and receiving them, etc. or exploit them to acquire information about the user, financial information, etc. In other instances third parties seek to download tracking software, viruses etc. to the user's computer systems. Today these include, but are not limited to, message intercepting, email logging, hacking, spamming, phishing, spyware, malware, keyloggers, screen capturing, Trojan horses, WWW robots (BOTs or bots), IP spoofing, man-in-the-middle attacks, worms and viruses.

Accordingly, with electronic messaging (EM) it is important to distinguish between Internet and internal EM systems. With the Internet an EM may travel and be stored on networks and computers outside the sender's or the recipient's control. During the transit time it is possible that third parties read or even modify the content. In contrast, internal EM systems, in which the information never leaves the organizational network, may be more secure, although information technology personnel and others whose function may involve monitoring or managing may be accessing the email of other employees. However, even with internal EM systems a successful penetration of the firewall(s) and other network security measures of the organization may result in information being sent outside the internal EM systems.

Accordingly, whilst it does not prevent interception, the exploitation of encryption techniques should prevent the message content being immediately visible to the interceptor. Within an encryption scheme, the message or information, referred to as plaintext, is encrypted using an encryption algorithm, generating ciphertext that can only be read if decrypted. For technical reasons, encryption schemes usually exploit a pseudo-random encryption key generated by an algorithm although other encryption keys may be employed. It is in principle possible to decrypt the message without possessing the key, but, for a well-designed encryption scheme using such pseudo-random encryption keys, large computational resources and skill are required. An authorised recipient can easily decrypt the message with the key, provided by the originator to recipients but not to unauthorised interceptors.

Other techniques seeking to remedy the third party attacks and intercepts include Virtual Private Networks or The Onion Router (Tor) anonymity network can be used to encrypt traffic from the user machine to a safer network while GNU Privacy Guard (GPG), Pretty Good Privacy (PGP), Secure/Multipurpose Internet Mail Extension (S/MIME) exploiting traditional public key cryptography, and SMEmail exploiting elliptic curve cryptography, can be used for end-to-end message encryption, and Simple Mail Transport Protocol and STARTTLS (SMTP over Transport Layer Security/Secure Sockets Layer) can be used to encrypt communications for a single mail hop between the SMTP client and the SMTP server.

However, these prior art methodologies are intended to protect the message by converting the plaintext at the sender's terminal to ciphertext for transmission before it is re-converted to plaintext at the receiver's (or recipient's) terminal. However, once decrypted the message content, now in plaintext is accessible to malware, Trojan horse software, etc. upon the recipient's terminal allowing its contents to be acquired and transmitted without the recipient's and/or sender's knowledge.

Accordingly, it would be beneficial to provide users with methods and systems enabling secure messaging to be undertaken as well as secure document transmission and viewing that overcomes the limitations within the prior art. Accordingly, beneficially embodiments of the invention provide secure messaging and secure document transmission even upon potentially compromised desktop computers.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to messaging and encryption and more particularly to techniques for secure messaging and document viewing without exposing the decrypted message or document on a potentially compromised computer system.

In accordance with an embodiment of the invention there is provided a method comprising:
encrypting the content with a first encryption key for transmission to the user to generate encrypted content;
transmitting the encrypted content to the user;
scanning the encrypted content; and
decrypting the scanned encrypted content with a second encryption key for presentation to the user.

In accordance with an embodiment of the invention there is provided executable software stored upon a non-transient physical medium, wherein the executable software when executed provides a user with access to a method of secure messaging, the method comprising the steps of
encrypting the content with a first encryption key for transmission to the user to generate encrypted content;
transmitting the encrypted content to the user;
scanning the encrypted content; and decrypting the scanned encrypted content with a second encryption key for presentation to the user.

In accordance with an embodiment of the invention there is provided a method comprising the steps of encrypting the content with a first encryption key for transmission to the user to generate encrypted content, transmitting the encrypted content to the user over a network to a first electronic device, scanning the encrypted content when displayed on the first electronic device with a second electronic device, and decrypting the scanned encrypted content with a second encryption key for presentation to the user.

In accordance with an embodiment of the invention there is provided a method of providing content to a user comprising the steps of encrypting the content with a first encryption key for transmission to the user to generate encrypted content, and either removing all data relating to the encryption from the encrypted content file or replacing with data that appears to relate to the encryption but is not relating to the encryption performed.

In accordance with an embodiment of the invention there is provided a method comprising the steps of processing an encrypted file by scanning ciphertext within the encrypted file and applying a deciphering algorithm to the ciphertext in order to display readable plain text to a user, wherein the display providing the readable plain text to the user is a portable electronic device and the ciphertext is part of a printed document, an electronically displayed document, or electronic text contained within an electronic message.

In accordance with an embodiment of the invention there is provided a method comprising automatically enabling a software application when a location of an electronic device upon which the software application is installed is within a predetermined geographical region, and automatically disabling the software application when the location of an electronic device upon which the software application is installed is outside the predetermined geographical region.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 3A to 3C depict embodiments of the invention relating to receiving and decrypting electronic content by a user;

FIG. 4 depicts an embodiment of the invention relating to receiving and decrypting electronic content by a user with parallel encoded transmission of decryption key identity;

FIGS. 5A and 5B depict embodiments of the invention relating to receiving and decrypting electronic content by a user exploiting web pages;

FIG. 8 depicts an embodiment of the invention relating to decrypting electronic content based upon geotag/geofence policy management; and FIG. 9 depicts an embodiment of the invention relating to transmitting content by encrypting electronic content generated by a user with parallel encoded transmission of decryption key identity.

DETAILED DESCRIPTION

Figure 1A:
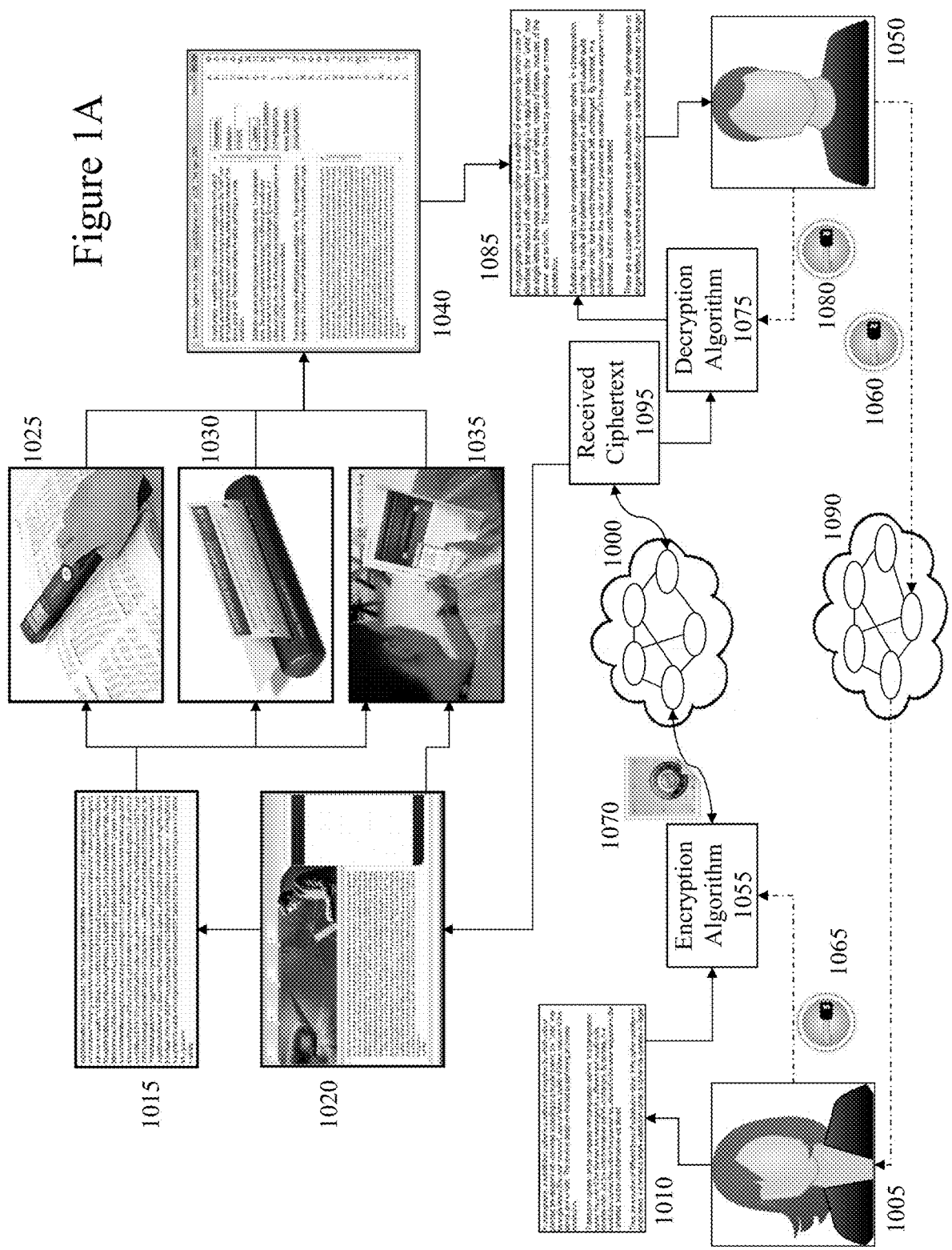
FIG. 1A depicts an overview of an embodiment of the invention.

The present invention is directed to messaging and encryption and more particularly to techniques for secure messaging and document viewing without exposing the decrypted message or document on a potentially compromised computer system.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals who by their engagement with a service provider, third party provider, enterprise, social network, social media etc. via a dashboard, web service, website, software plug-in, software application, graphical user interface accesses, for example, electronic content and/or an electronic service. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may be characterised by accessing, for example, electronic content and/or an electronic service.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

"Encryption" (also referred to as encrypting) as used herein may refer to, but is not limited to, the process of encoding electronic content with the intention that only authorized parties (recipients) can read it. "Decryption" (also referred to as decrypting) as used herein may refer to, but is not limited to, the process of un-encoding electronic content with the intention that an authorized parties (recipients) can read it, wherein the electronic content has previously been encoded through an encryption technique. Encryption and decryption techniques may include, but are not limited to, symmetric encryption schemes wherein the encryption and decryption keys are the same such that the communicating parties must have the same key before they can achieve secret communication and asymmetric encryption schemes (also known as public-key encryption schemes) wherein the encryption key is published for anyone to use and encrypt messages but only the receiving party has access to the decryption key that enables messages to be read. Examples of symmetric key schemes include, but are not limited to, Advanced Encryption Standard (AES), Blowfish, Data Encryption Standard, Serpent, Twofish, and RC4 as well as others (see for example Wikipedia website article on Symmetric Key Algorithm). Examples of asymmetric key schemes include, but are not limited to, Diffie-Hellman key exchange, Digital Signature Standard, ElGamal, elliptic curve cryptography. Password-authenticated key agreements, Paillier cryptosystems, RSA, YAK, and Cramer-Shoup cryptosystem.

Now referring to FIG. 1A there is depicted an overview of an embodiment of the invention. As depicted a sender 1005 wishes to send plaintext 1010 to a recipient 1050 who can also see it as received plaintext 1085. Accordingly, the sender generates and encrypts the plaintext 1010 upon an electronic device, e.g. a PED or FED, with an encryption algorithm 1055 employing a first key 1065 to generate ciphertext 1070. This ciphertext is transmitted to the recipient 1050 via a network 1000 using an EM scheme such as email, text, SMS, or social media posting for example. Accordingly, the ciphertext 1070 is received by the recipient upon an electronic device, e.g. a PED or FED, wherein the received ciphertext 1095 is then decrypted by a decryption algorithm 1075 to generate received plaintext 1085 which is then accessible to the recipient 1050. The decryption algorithm employing a second key 1080. Optionally, the recipient 1050 may send the sender 1005 a third key 1060, via a second network 1090, which they use as the first key 1065 to encrypt the plaintext 1010, e.g. as within a symmetric key cryptographic methodology. Alternatively, the first key 1065 may be a public key and the second key 1080 is the private key, e.g. as within an asymmetric or public key cryptographic methodology.

Within embodiments of the invention, in contrast to the prior art, rather than the received ciphertext 1095 being processed directly by the decryption algorithm 1075 to generated received plaintext 1085 it is presented to the user as printed ciphertext 1015 or displayed ciphertext 1020, e.g. upon a webpage or within an EM messaging system. In the instance of printed ciphertext 1015 this may be scanned using a handheld scanner 1025, desktop scanner 1030 or PED 1035 to provide the content to decryption software 1040 applying the decryption algorithm 1075 with the second key 1080. The output of the decryption software 1040 being received plaintext 1085. Accordingly, whilst FIG. 1A depicts an EM methodology from sender 1005 to recipient 1050 via network 1000 it would be evident that the ability to handle printed ciphertext 1015 allows for alternate transmission methodologies including, but not limited to, physical printing and mail (e.g. postal transmission) from sender to recipient, local printing of EM sent by sender 1005 to recipient 1050, e.g. external to a firewall of the recipient's EM systems. Further, the displayed ciphertext 1020 allows a recipient to access a URL displaying the ciphertext 1070, e.g. an unsecured PED or FED, acquire the ciphertext 1070 through optical character recognition (OCR) on another device, e.g. a PED, wherein the ciphertext 1070 is decrypted locally upon the another device.

Accordingly, within an embodiment of the invention an encrypted message or encrypted document can be viewed by a recipient using a PED, e.g. their smartphone, which is loaded with the embodied application. By "scanning" the encrypted ciphertext document, ciphertext webpage content, or ciphertext message using a camera within the PED followed by Optical Character Recognition (OCR) of the captured camera content then the ciphertext can be "scanned" and converted to plaintext in real time for presentation to the recipient (user) based upon the embodied application executing a decryption process upon the ciphertext. As such the presentation may be visually upon the user's PED, audiovisually on the user's PED, or audiovisually upon a wearable device of the user. Within other embodiments of the invention the ciphertext may be extracted from, for example, received emails, text messages, SMS messages, webpages etc. automatically and presented to the user directly upon a PED, for example. Alternatively, extraction and reception of the ciphertext may be performed upon a FED and transmitted locally within a network to the user's PED for deciphering and presentation.

Figure 1B:
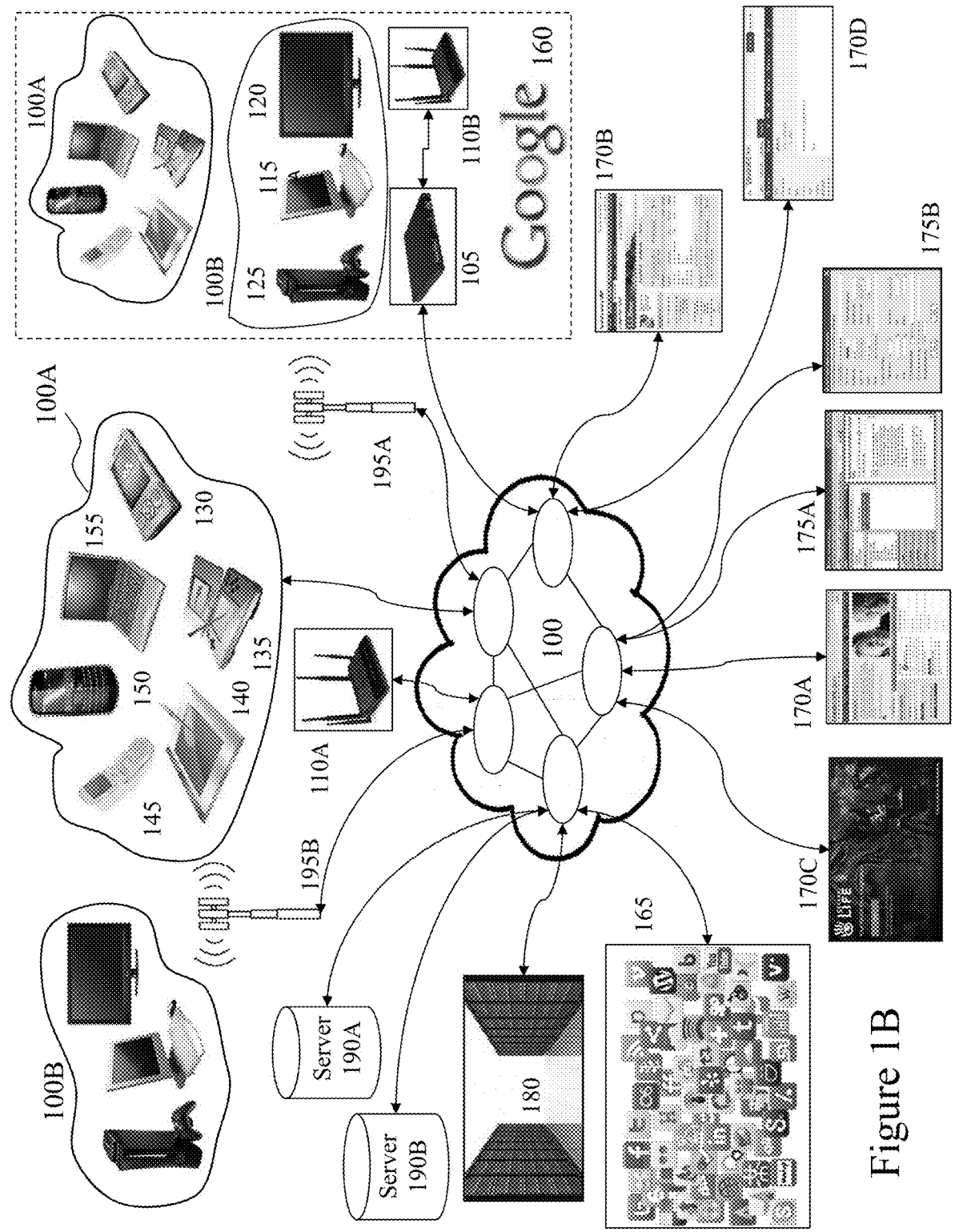
FIG. 1B depicts a network environment within which embodiments of the invention may be employed.

Referring to FIG. 1B there is depicted a network environment 100 within which embodiments of the invention may be employed supporting password systems and/or password applications/providers (PSPAPs) according to embodiments of the invention. Such PSPAPs, for example support the provisioning of data to a user, e.g. electronic mail, the provisioning of services, e.g. online banking, online retail, etc., as well as other personal and work related resources, systems, data, etc. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Google™, within which other first and second user groups 100A are and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 and Bluetooth as well in an ad-hoc manner.

Also connected to the network 100 are Social Networks (SOCNETS) 165, such as Facebook™, LinkedIn™, first and second services 170A and 170B respectively, e.g. US Medicare.GOV and Bank of America™, website 170C, e.g. Second Life™, cloud based email service 170D, e.g. Yahoo!™, EM system 175A, e.g. Microsoft™ Outlook™, and digital document signature function 175B, e.g. Adobe™ Acrobat, as well as first and second servers 190A and 190B which together with others, not shown for clarity. First and second servers 190A and 190B may host according to embodiments of the inventions multiple services associated with a provider of password systems and password applications/providers (PSPAPs); a provider of a SOCNET or Social Media (SOME) exploiting PSPAP features; a provider of a SOCNET and/or SOME not exploiting PSPAP features; a provider of services to PEDS and/or FEDS; a provider of one or more aspects of wired and/or wireless communications; an Enterprise 160 exploiting PSPAP features; license databases; content databases; image databases; content libraries; customer databases; websites; and software applications for download to or access by FEDs and/or PEDs exploiting and/or hosting PSPAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides PSPAP features according to embodiments of the invention; execute an application already installed providing PSPAP features; execute a web based application providing PSPAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
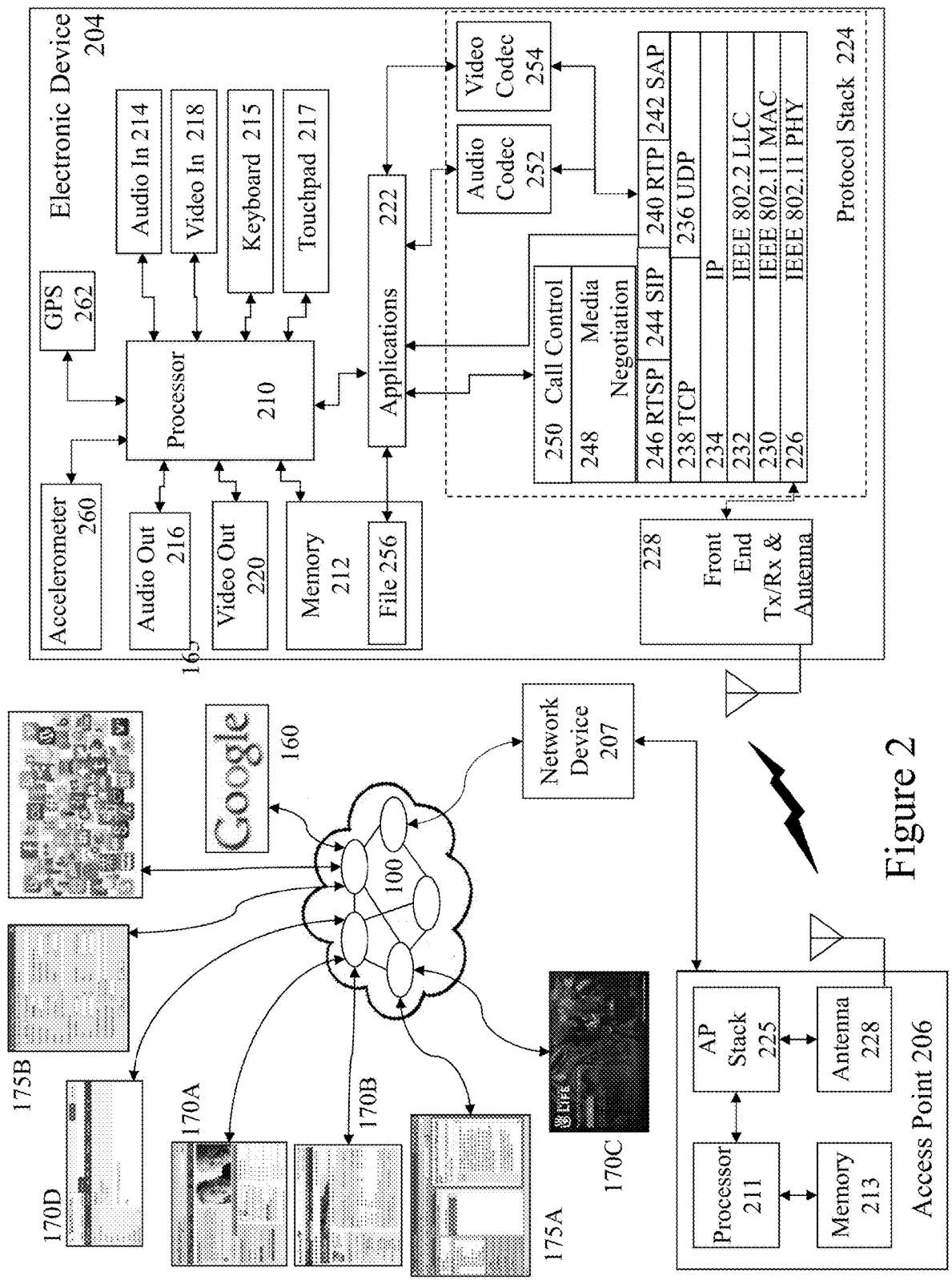
FIG. 2 depicts a wireless portable electronic device supporting communications to a network such as depicted in FIG. 1B and as supporting embodiments of the invention.

Now referring to FIG. 2 there is depicted an electronic device 204 and network access point 207 supporting PSPAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, such as Facebook™, LinkedIn™, first and second services 170A and 170B respectively, e.g. US Medicare.GOV and Bank of America™, website 170C, e.g. Second Life™ cloud based email service 170D, e.g. Yahoo!™, EM system 175A, e.g. Microsoft™ Outlook™ and digital document signature function 175B, e.g. Adobe™ Acrobat, The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

FIGS. 3A to 3C depict embodiments of the invention relating to receiving and decrypting electronic content by a user wherein a code, e.g. a Quick Response (QR) code, is captured by an application as part of the scanning acquisition of the ciphertext or separately in order to obtain data identifying private encryption key should be used to unlock or decrypt the appropriate symmetric key for use in decrypting and viewing the encrypted ciphertext to plaintext. Optionally, the QR code could also be used to identify which encryption/decryption standard is used for securing the ciphertext or electronic file. Alternatively, the QR code could itself also be in an encrypted format that can only be unlocked by the user's private key. Optionally, the QR code itself could contain hypertext relating which needs to be decrypted by the application before any of the processes can be performed as the hypertext relates to a hyperlink identifying a Uniform Resource Locator (URL) relating to the location of the encrypted text or file on the Internet, private network, etc.

Within the subsequent descriptions of embodiments of the invention terms such as scanning, performing a scan, a scan, etc. refer to a sequence of operations wherein content is captured using a first process, e.g. optically scanning or optically imaging the content to generate an optical image or images, and a second process, e.g. optical character recognition, to convert the image to cipher text. Similarly some steps have been omitted, e.g. displaying the decrypted plaintext to the user, in order to keep process descriptions focused to the steps relating to embodiments of the invention but such omitted steps would be evident to one of skill in the art.

Accordingly, referring to FIG. 3A there is depicted a process comprising the steps of:
 Step 310 Start process;
 Step 320 Receive encrypted content and scan using PED with application;
 Step 330 Receive and scan QR code;
 Step 335 Determine private encryption key in dependence upon the QR code;
 Step 340 Decrypt using the selected private encryption key the received encrypted content; and
 Step 345 Stop process.

Now referring to FIG. 3B there is depicted a process comprising the steps of:
 Step 350 Steps 310 to 335 of FIG. 3A to receive content, receive QR code, and determine private encryption key wherein the private encryption key is encoded within the QR code;
 Step 355 "Unlock" the decryption key to be employed in decrypting the content using the private encryption key extracted from the QR code, e.g. by hashing the extracted private encryption key with a stored encrypted key, performing a predetermined mathematical process upon the extracted private encryption key, performing a predetermined mathematical process upon the extracted private encryption key incorporating the user's device identity so that the decryption is locked to a specific predetermined device, or unlocking the PEK from a key vault upon the recipient's electronic device; and Step 360 Steps 340 and 345 of FIG. 3A to decrypt content and stop the process.

Referring to FIG. 3C there is depicted a process comprising the steps of:

Step 350 Steps 310 to 335 of FIG. 3A to receive content, receive QR code, and determine private encryption key wherein the private encryption key is encoded within the QR code;

Step 365 Determine a second private encryption key, which may for example be according to one of the processes described in respect of step 355 in FIG. 3B or through the unlocking of the second PEK from a key vault upon the recipient's electronic device;

Step 370 Decrypt using the selected private encryption key the received encrypted content; and Step 375 Generate a reply to the sender in plaintext;

Step 380 Encrypt the recipient's reply using the determined second private encryption key;

Step 385 Transmit the encrypted replay to the sender; and

Step 390 Stop process.

In this process as the second private encryption key is established in dependence upon data transmitted by the sender then the PEK employed is established by the sender and may be hidden or unknown to the sender.

Now referring to FIG. 4 there is depicted an embodiment of the invention relating to receiving and decrypting electronic content by a user with parallel encoded transmission of decryption key identity comprising the steps;

Step 410 Steps 310 to 330 of FIG. 3A to start the process receive and scan the content and receive and scan the QR code;

Step 420 Decrypt the QR code using a first PEK;

Step 430 Determine a second PEK based upon the information decrypted from the QR code;

Step 440 Decrypt the received encrypted content with the second PEK; and

Step 450 Stop the process.

In this manner the QR code may be decrypted using a first PEK established, for example, based upon information within the QR code that is not encrypted as the reference only points to the correct first PEK within the application discretely or combination with other information such as sender, recipient device identity, etc. Alternatively the first PEK may be established solely upon information such as sender, time, date, location, etc. Accordingly, electronic content may be distributed but only become unlockable based upon a subsequent event, e.g. predetermined location met, predetermined time met, or a new key vault is downloaded containing the PEK.

FIGS. 5A and 5B depict embodiments of the invention relating to receiving and decrypting electronic content by a user exploiting web pages. Accordingly, a QR code may contain hypertext which needs to be decrypted by the application before any of the electronic content can be accessed. As with FIG. 4 the electronic content to be deciphered and presented to the user may be only provided at a later date/time or the user be attached to a private network containing the data to which the hypertext, e.g. hyperlink or URL, points. The decrypted QR code may also contain additional credentials and/or information.

Considering initially FIG. 5A then the process comprises steps:

Step 510 Start the process.

Step 515 Receive and scan QR code;

Step 520 Decrypt the QR code content with PEK;

Step 525 Access URL using decrypted QR code data

Step 530 Retrieve (e.g. view) and scan the encrypted content;

Step 535 Decrypt the retrieved encrypted content with the PEK;

Step 540 Stop the process.

FIG. 5B varies the process slightly using two PEKs and comprises steps:

Step 550 Comprising steps 510 to 530 of FIG. 5A to receive the QR code, decrypt the URL, access the URL, and retrieve the encrypted content;

Step 555 Decrypt a second QR code embedded within the content retrieved from the URL;

Step 560 Determine a second PEK in dependence upon the information decrypted from the QR code within the retrieved content;

Step 565 Decrypt the retrieved encrypted content with the second PEK; and

Step 570 Stop the process.

Within embodiments of the invention it would be apparent that as the information relating to the PEK to employ may be derived from a separate source than the actual electronic content being distributed then within some embodiments of the invention the encryption information within a file's meta-tag file header can be removed thereby enhancing security by removing any plain text identification of security methods that have been used to secure the file. This enhances cryptographic security, as a hacker has no information as to the format or attack methods to be used to compromise the secured message/file.

Figure 6:
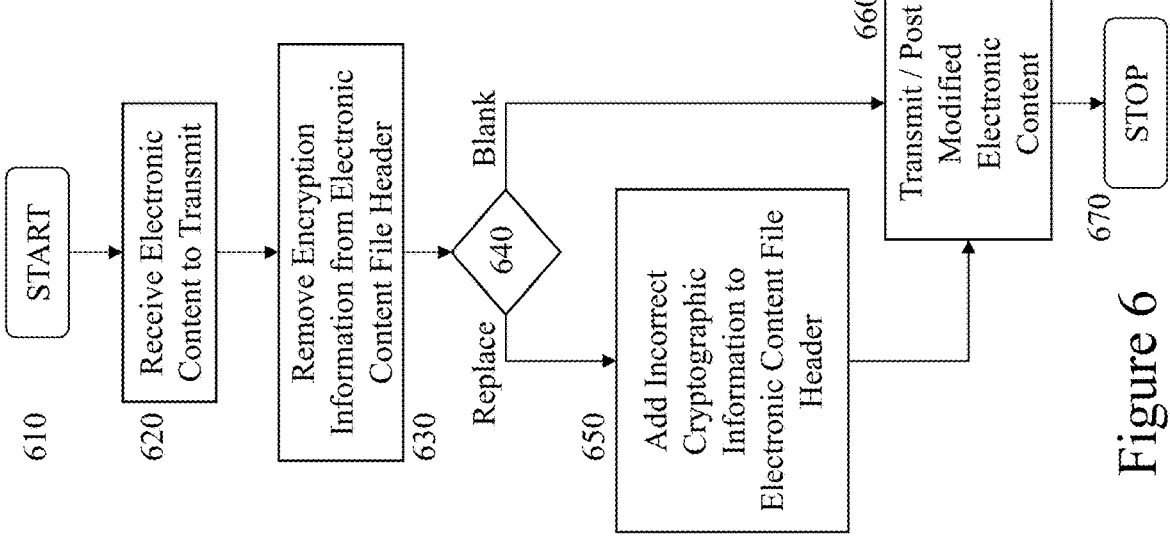
FIG. 6 depicts an embodiment of the invention relating to transmitting content with meta-data removal or amendment to remove reference to encryption employed.

Referring to FIG. 6 there is depicted a process flow according to an embodiment of the invention relating to transmitting content with meta-data removal or amendment to remove reference to encryption employed. The process flow comprising steps:

Step 610 Start the process

Step 620 Receive electronic content to transmit;

Step 630 Remove encryption information from electronic content file header;

Step 640 Determine whether to replace with false cryptographic information or leave blank;

Step 650 Replace electronic content file header with incorrect cryptographic information upon determination in step 640;

Step 660 Leave electronic content file header blank based upon determination in step 640;

Step 670 Stop the process.

Based upon the user device upon which the decryption application is installed then embodiments of the invention may exploit locational awareness within the application in order to further enhance security as the location of viewing a document can also be employed in determining whether actions such as key retrieval, key generation, decryption, and encryption for example. By applying, for example, latitude and longitude location information or geotags which are embedded and/or encrypted within a QR code or the encrypted file header, for example, then the application can initially check that the electronic device is at the specified location or within an accepted range/boundary, i.e. a geo-fence, of the specified location before commencing the decryption process.

Within other embodiments, e.g. secure environments, then the decryption functionality may be locked permanently to a predetermined location or geo-location which may be determined, for example, through GPS determined coordinates, local wireless network proximity and/or identity, Bluetooth beacon connection/identity, or other location detecting means as known within the art. Referring to FIGS.

7 and 8 there are depicted process flows relating to geotags/ location/geo-fencing according to embodiments of the invention.

Figure 7:
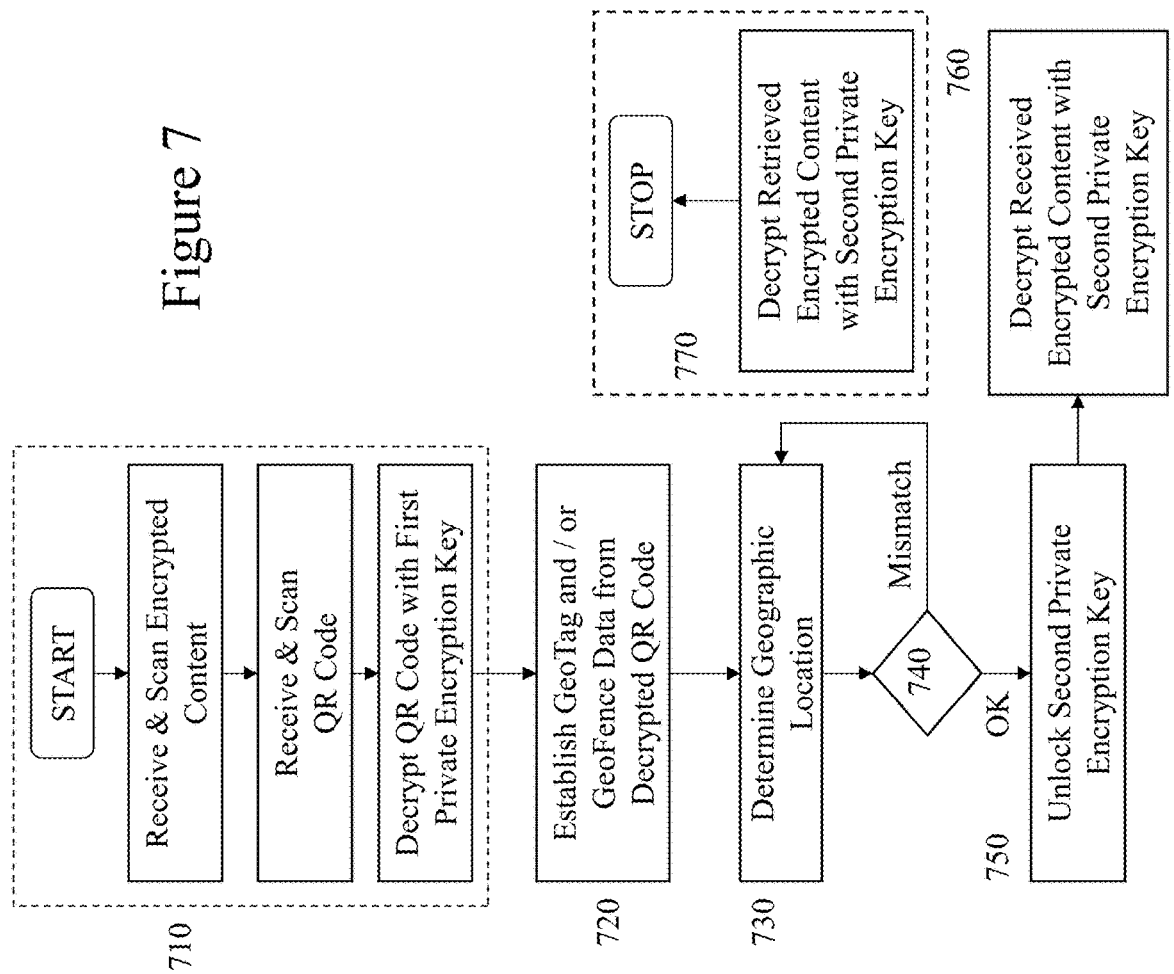
FIG. 7 depicts an embodiment of the invention relating to receiving and decrypting electronic content received by a user with geotag/geofence policy management.

Referring to FIG. 7 there is depicted an embodiment of the invention relating to receiving and decrypting electronic content received by a user with geotag/geofence policy management. The process comprising the steps:

Step 710 Comprising steps 410 and 420 in FIG. 4 the process starts, receives the scanned encrypted content, receives and scans a QR code, and then decrypts the QR code with a first private encryption key;

Step 720 Establish geotag and/or geo-fence data from the decrypted QR code;

Step 730 The application determines the geographic location of the user's electronic device;

Step 740 A determination is made with respect to the current geographic location and the geotag and/or geo-fence data extracted from the decrypted QR code;

Step 750 Where the determination in step 740 is that the user's electronic device location matches the geotag/ geo-fence data extracted from the decrypted QR code then the process proceeds to unlock a second PEK before proceeding to step 760;

Step 760 Where the determination in step 740 is that the user's electronic device location does not match the geotag/geo-fence data extracted from the decrypted QR code then the process loops back to step 730 to acquire new location data; and Step 770 Once the second PEK has been unlocked in step 760 the process proceeds in step 770 to decrypt the received content using the second PEK and stop.

Now referring to FIG. 8 there is depicted a process flow chart for an embodiment of the invention relating to decrypting electronic content based upon geotag/geofence policy management. The process comprising the steps:

Step 810 Process starts.

Step 815 Process establishes geotag and/or geo-fence data;

Step 820 Determination is made of the current geo-location of the user's electronic device executing the application;

Step 825 A determination is made with respect to the current geographic location and the geotag and/or geo-fence data, wherein if the user's electronic device location matches the geotag/geo-fence data then the process proceeds to step 830 otherwise if the determination is that the user's electronic device location does not match the geotag/geo-fence data then the process loops back to step 820 to acquire new location data;

Step 830 With the geographic location matching the geotag and/or geo-fence data extracted from the decrypted QR code the process proceeds to unlock the decryption software;

Step 835 With the decryption software enabled this enables QR code decryption, PEK retrieval, and content decryption as well as other functions of the decryption software;

Step 840 A determination is made with respect to the current geographic location and the geotag and/or geo-fence data, wherein if the user's electronic device location matches the geotag/geo-fence data then the process proceeds to loop back to continuously monitor the location otherwise if the determination is that the user's electronic device location does not match the geotag/geo-fence data then the process proceeds to step 845;

Step 845 The decryption software is locked;

Step 850 With the decryption software disabled then this disables QR code decryption, PEK retrieval, and content decryption as well as other functions of the decryption software, wherein the process loops back to step 820.

It would be evident that the geolocation and geofencing enabling/disabling of a software application providing secure messaging functionality may also be applied to other software applications. Optionally, a software application providing secure messaging functionality may only display plaintext when the electronic device upon which it is installed upon is within the predetermined geolocation and/ or geofence and will not save the plaintext.

With the descriptions of embodiments of the invention described supra in respect of FIG. 3A to FIG. 8 the emphasis has been towards the receipt of encrypted electronic content and its subsequent decryption through scanning the electronically displayed encrypted electronic content or scanning a hard copy of the encrypted content. However, it would be evident to one skilled in the art that the same application or another application can be employed in reverse to create encipher content. In this process, the user would use a PED, e.g. their smartphone or tablet, to scan plaintext and convert it to cipher-text, to be sent to selected user in a secure manner. Accordingly, referring to FIG. 9 there is depicted a process flow according to an embodiment of the invention relating to transmitting content by encrypting electronic content generated by a user with parallel encoded transmission of decryption key identity. The process comprising the steps:

Step 910 The process starts;

Step 915 Content for encryption is scanned;

Step 920 A first PEK is determined;

Step 925 The scanned content is encrypted with the first PEK;

Step 930 The encrypted content is posted to a URL;

Step 935 A second PEK is determined;

Step 940 The first PEK is encrypted into a QR code using the second PEK;

Step 945 The QR code is posted to the URL; and

Step 950 The process stops.

It would be apparent to one skilled in the art that embodiments of the invention allow for secure messaging of encrypted files which can be delivered as electronic file documents, subsequently scanned by an application from a display or hard copy, and then the application decrypts the encrypted information into plaintext for viewing on the user's electronic device.

Within the embodiments of the invention described supra in respect of FIG. 1 and FIG. 3A to FIG. 9 codes where employed for the transfer of information have been described as being QR codes. Such QR codes may be established at a variety of data types (mode or input character set), versions (i.e. overall dimensions), and error correction levels. It would also be evident that data may be encoded within only a portion or predetermined portions of a QR code whilst the remainder of the QR code may be obfuscating code. Optionally, a single QR code may be employed with multiple users wherein due to the settings of their application it is targeted at a different section of the QR code. In addition to QR codes it would be evident that other types of matrix barcode and linear barcodes may be employed including, but not limited to, the alternative linear barcodes and two-dimensional (2D or matrix) barcode symbologies may be found listed in Wikipedia, see http:// en.wikipedia.org/wiki/Barcode#Symbologies, and within the references referred to therein.

It would be apparent to one skilled in the art that embodiments of the invention allow for the use of multiple encryption keys and encryption methods to be used by the application, as these may be loaded and/or selected into the application based upon a code, e.g. a QR code scanned in association with the received encrypted file. This code may establish the encryption key to be employed directly or provide a pointer to a stored encryption key, e.g. within an encryption key vault on the user's device.

Optionally embodiments of the invention may be embedded into third party software applications, e.g. electronic mail applications, word processors, social media applications etc., such that encrypted content can only be decrypted and displayed when the electronic device is within a predetermined location, such as determined by Wi-Fi access point identity for example, geographic location or geographic boundary, such as determined by GPS for example. In such instances, features such as saving etc. may be similarly disabled unless the saved file is an encrypted file.

It would be apparent to one skilled in the art that embodiments of the invention allow for decryption of a document without transmitting the document to the electronic device decrypting it nor for decryption software to be on the electronic device where the document is being displayed. Accordingly, malware attacks upon the electronic device receiving the encrypted information cannot access the decrypted contents as they are never generated upon the device receiving the decrypted content.

It would be apparent to one skilled in the art that a message may be generated containing content for multiple users and distributed to all simultaneously. However, only that portion of the message intended for a specific recipient would be decrypted with their private encryption key whilst other elements would not be converted.

It would be apparent to one skilled in the art that secure messages can be printed and mailed on paper or embedded as part of product packaging, for example. Accordingly, for example, personal information relating to a purchaser could be encrypted, attached or form part of a product, and then be shipped with the product such that only the recipient can retrieve the information. Alternatively, each motor vehicle sold may be identified with an encoded code upon its dashboard, similar to a Vehicle Identification Number, but now only accessible by the purchaser of the vehicle wherein subsequently vehicle history, GPS data, or other information may be accessed through a unique URL associated to the vehicle wherein only the purchaser of the vehicle can access it. However, subsequently upon verified sale of the vehicle to the manufacturer or a licensing authority the URL may be associated to a new unique URL and a new unique encryption key etc. issued.

It would be evident that whilst the embodiments of the invention remove many of the drawbacks of viewing and receiving content upon electronic devices which may have malware etc. they do not remove many of the advantages of public and/or private key encryption including the ability to age keys, issue keys, rotate keys, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium"

includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of providing content to a user comprising the steps of:
    encrypting the content to be provided to the user upon a first electronic device connected to a first communications network with an encryption key for transmission to the user to generate an encrypted content file;
    modifying the encrypted content after encrypting the content by replacing all data relating to the encryption within the encrypted content file with data that appears to relate to the encryption but is not relating to the encryption performed;
    transmitting and rendering the encrypted content file to the user;
    scanning the rendered encrypted content with an optical device forming part of a second electronic device connected to the first communications network; and
    decrypting the scanned rendered encrypted content upon the second electronic device with a decryption key for presentation to the user upon a display; wherein
    the decryption key is encrypted within a code transmitted together with the encrypted content file and decrypted for use using a third encryption key stored upon the second electronic device.

2. The method according to claim 1, further comprising the step of
    modifying the encrypted content file after encrypting the content by removing all data relating to the encryption process performed from the encrypted content file and leaving just the encrypted content.

3. The method according to claim 1, wherein
    the step of scanning further comprises scanning of a code to identify which decryption key should be used to decrypt the received encrypted content.

4. The method according to claim 1, wherein
    rendering the encrypted content file comprises rendering the encrypted content on a third electronic device comprises displaying electronic text within an electronic message.

5. The method according to claim 1, wherein
    the steps of encrypting the content, transmitting the encrypted content file, scanning the received encrypted content and decrypting the scanned encrypted content are performed by one or more software applications in execution upon one or more electronic devices; and
    the associated software application for each step is at least one of:
        automatically enabled when a location of the electronic device it is in execution upon is upon which the software application is installed is within a predetermined geographical region, and
        automatically disabled when a location of the electronic device it is in execution upon is upon which the software application is installed is outside a predetermined geographical region.

6. The method according to claim 1, wherein
    an electronic file associated with the transmission of the encrypted content file contains no meta-data or data relating to the encryption process performed in generating the encrypted content file from the content; and at least one of:
  the decryption key is established in dependence upon at least one of an identity of a sender sending the encrypted content file, a time of sending the encrypted content file, a date of sending the encrypted content file and a location; and
  the encrypted content file only becomes unlockable based upon a subsequent event, the subsequent event being at least one of a predetermined location is met and a predetermined time is met.

7. The method according to claim 1, wherein
the decryption key is established in dependence upon data identifying it obtained via a different process to the scanning of the rendered encrypted content; and
the data identifying the decryption key comprises at least one of an identity of a sender sending the encrypted content file, a time of sending the encrypted content file, a date of sending the encrypted content file and a location.

8. The method according to claim 1, wherein
transmitting the encrypted content file to the user comprises providing the encrypted content file as part of an item of web accessible content identified by a uniform resource locator (URL) and providing the user with the URL.

9. The method according to claim 1, wherein
the step of scanning comprises extracting an identifier of the decryption key to be employed by the deciphering algorithm from header text information preceding the cipher-text within the received encrypted content.

10. The method according to claim 1, further comprising
extracting a code to identify at least one of a geographic location and a geographic region;
enabling the decryption process when a current location of the second electronic device user meets the at least one of the geographic location and the geographic region; and
disabling the decryption process when a current location of the second electronic device user does not meet the at least one of the geographic location and the geographic region.

11. The method according to claim 1, further comprising
rendering and scanning a code transmitted either with or in parallel to the transmission of the electronic content file;
decrypting at least one of a geographical tag and geographical fence data from the rendered and scanned code;
determining a geographic location of the second electronic device;
determining whether to decrypt the scanned rendered encrypted content in dependence upon whether the geographic location of the second electronic device meets a predetermined condition with respect to the at least one of the geographical tag and the geographical fence data.

12. The method according to claim 1, further comprising
rendering and scanning a code transmitted either with or in parallel to the transmission of the electronic content file;
decrypting hypertext from the rendered and scanned code; where
the hypertext relates to a hyperlink identifying a Uniform Resource Locator (URL) relating to the location of the encrypted content file accessible to the second electronic device via a second communications network.

13. The method according to claim 1, further comprising
decrypting at least one of a geographical tag and geographical fence data from either the decrypted scanned rendered encrypted content or a code transmitted to the second electronic device and associated with the scanned rendered encrypted content;
determining a geographic location of the second electronic device; and
only enabling the decryption of the scanned rendered encrypted content when the geographic location meets a predetermined condition with respect to the at least one of the geographical tag and the geographical fence data; wherein
the decrypted encrypted content is not stored upon the second electronic device.

14. The method according to claim 1, further comprising
accessing an item of web accessible content identified by a uniform resource locator (URL);
acquiring another item of encrypted content comprising a first predetermined portion of the item of web accessible content;
decrypting the another item of encrypted content;
determining another decryption key in dependence upon the decrypted another item of encrypted content; and
decrypting a second predetermined portion of the item of web accessible content, wherein,
the encrypted content file transmitted to the user comprises the URL which is decrypted to provide access to the other encrypted content.

15. The method according to claim 1, wherein
the encrypted content file and the another item of encrypted content are machine readable codes.

16. The method according to claim 1, wherein
the first encryption key is established in dependence upon at least one of an identity of a sender sending the encrypted content file, a time of sending the encrypted content file, a date of sending the encrypted content file and a location.

17. The method according to claim 1, wherein
transmitting and rendering the encrypted content to the user comprises:
  posting the encrypted content to an item of web accessible content defined by a Uniform Resource Locator (URL); and
  rendering the item of web accessible content to the user when the user navigates to the URL through a web browser;
the encryption key is encrypted into a machine readable code using another encryption key; and
the machine readable code is also posted to the URL.

18. A method of providing content to a user comprising the steps of:
encrypting the content to be provided to the user upon a first electronic device connected to a first communications network with an encryption key for transmission to the user to generate an encrypted content file;
modifying the encrypted content after encrypting the content by replacing all data relating to the encryption within the encrypted content file with data that appears to relate to the encryption but is not relating to the encryption performed;
transmitting and rendering the encrypted content file to the user;
transmitting a decryption key in parallel to the encrypted content file;

scanning the rendered encrypted content with an optical device forming part of a second electronic device connected to the first communications network; and decrypting the scanned rendered encrypted content upon the second electronic device with the decryption key for presentation to the user upon a display; wherein the decryption key is encrypted within a code and decrypted for use using a third encryption key stored upon the second electronic device.

\* \* \* \* \*